US008429251B2

(12) United States Patent
Brunner

(10) Patent No.: US 8,429,251 B2
(45) Date of Patent: Apr. 23, 2013

(54) METHOD FOR THE CONSISTENT PROVISION OF CONFIGURATION DATA IN AN INDUSTRIAL AUTOMATION SYSTEM COMPRISING A PLURALITY OF NETWORKED CONTROL UNITS, AND INDUSTRIAL AUTOMATION SYSTEM

(75) Inventor: Felix Brunner, Zürich (CH)

(73) Assignee: Siemens AG, Munich (DE)

( * ) Notice: Subject to any disclaimer, the term of this patent is extended or adjusted under 35 U.S.C. 154(b) by 548 days.

(21) Appl. No.: 12/712,408

(22) Filed: Feb. 25, 2010

(65) Prior Publication Data
US 2010/0223493 A1    Sep. 2, 2010

(30) Foreign Application Priority Data
Feb. 27, 2009   (EP) .................................... 09002831

(51) Int. Cl.
*G06F 15/177* (2006.01)
(52) U.S. Cl.
USPC ........................................................ 709/220
(58) Field of Classification Search .................. 709/220; 700/19, 20, 108, 109, 110, 117
See application file for complete search history.

(56) References Cited

U.S. PATENT DOCUMENTS
6,748,429 B1 *  6/2004  Talluri et al. .................. 709/221
2009/0172223 A1 *  7/2009  Lee et al. ...................... 710/104

FOREIGN PATENT DOCUMENTS
EP          1 117 210        7/2001
WO     WO 2008/090216        7/2008

OTHER PUBLICATIONS

Pohl et al., "Service-orientation and Flexible Service Binding in Distributed Automation and Control Systems", Advanced Information Networking and Application—Workshops (2008), pp. 1393-1398.

* cited by examiner

*Primary Examiner* — Jerry Dennison
*Assistant Examiner* — Davoud Zand
(74) *Attorney, Agent, or Firm* — Cozen O'Connor

(57) ABSTRACT

For the consistent provision of configuration data in an industrial automation system comprising a plurality of networked control units, components of a service are combined by a local service configuration unit using a standard configuration interface to form a service. Services are configured by configuration data and activated, where the configuration data comprise information relating to the attribution of services to control units and dependencies between services. The configuration data are accepted from a control and monitoring unit in the industrial automation system by a system configuration service, checked and transmitted to destination control units. The transmitted configuration data are checked by local service configuration units associated with the destination control units for changes in comparison with previously used configuration data. The local service configuration units use detected changes in the configuration data to ascertain lists of operations for performing configuration changes, where the lists are optimized to minimize service downtimes.

13 Claims, 3 Drawing Sheets

METHOD FOR THE CONSISTENT PROVISION OF CONFIGURATION DATA IN AN INDUSTRIAL AUTOMATION SYSTEM COMPRISING A PLURALITY OF NETWORKED CONTROL UNITS, AND INDUSTRIAL AUTOMATION SYSTEM

BACKGROUND OF THE INVENTION

Industrial automation systems are used for monitoring, controlling and regulating technical processes, such as in the field of production and process automation, and allow operation of machines and industrial installations when necessary as autonomously and as independently of human intervention as possible. Due to the continually increasing importance of information technology for automation systems, which comprise numerous networked computer units, methods for the reliable configuration and activation of distributed services for providing monitoring, control and regulation functions are becoming increasingly important.

Consistent with the previous approaches to a solution, configuration data are provided in distributed automation systems by appliance-specific configuration systems and are used for activating a local service. In addition, provision of configuration data is to date followed by immediate activation of the respective local service without further checking. In the case of distributed services whose service components are provided by a plurality of different computer units, uncoordinated configuration and activation of individual systems can cause problematic inconsistencies. Such inconsistencies endanger the error-free provision of a service and have a disadvantageous effect on system stability and availability.

SUMMARY OF THE INVENTION

It is therefore an object of the present invention to provide a method for the consistent provision of configuration data in an industrial automation system comprising a plurality of networked control units which allows reliable provision of distributed services, and to provide an automation system which is suitable for performing the method.

This and other objects and advantages are achieved in accordance with the invention by a method and an automation system in which functions of an automation system comprising a plurality of networked control units are provided by services from the control units. The control units are preferably programmable. In addition, the automation system may be a production, process or buildings automation system, for example. Components of a service are combined by a local service configuration unit using a standard configuration interface to form the service. The services are configured by configuration data and activated. The configuration data comprise information relating to the attribution of services to providing computer units and to dependencies between services. The configuration data are accepted by a system configuration service from a control and monitoring unit in the automation system, checked and transmitted to destination control units.

In an embodiment, the control and monitoring unit comprises an engineering system for configuring, maintaining, starting up and/or documenting the automation system. The transmitted configuration data are checked by local service configuration units associated with the destination control units for changes in comparison with previously used configuration data. The local service configuration units use detected changes in the configuration data to ascertain lists of operations for performing configuration changes. Here, the lists of operations are optimized to minimize service downtimes. The local service configuration units perform the ascertained operations for accepting configuration changes for local services or prompt the operations to be performed. In this way, the method in accordance with the invention allows reliable and consistent configuration and activation of services in an automation system. Particularly as a result of downtime-optimized ascertainment of operations for accepting configuration changes, it is possible for services and service components which are not affected by a configuration change to remain totally operational while configuration changes are performed.

In a preferred embodiment of the present invention, activation of a local service initially involves loading of the configuration data in a preparation phase. The local service is then provided in a finishing phase using the configuration data loaded in the preparation phase. In the event of failure of the preparation or finishing phase, the local service, which may comprise service components distributed over a plurality of control units, is provided in a reset phase using configuration data which are associated with a last error-free status. As a result, partial failure of acceptance of changed configuration data, in particular, cannot result in service malfunctions on account of inconsistent service configuration.

Advantageously, configuration data which are required at runtime are provided by the service configuration units. Consequently, particularly in the event of failure of the system configuration service, it is possible to continue to provide local services which have an associated activated trouble-free service configuration unit.

The configuration data can be stored for all control units in the automation system in a central database, while the configuration data can be stored for a selected control unit in a local database which is associated with the selected control unit. This allows reliable access to configuration data. Advantageously, the central database and local databases comprise version tables which are associated with the respective configuration data and which are aligned with one another. Thus, it is also possible to manage different version levels of the configuration data safely and efficiently.

Access to configuration data for a local service can be made available by either a global configuration and activation service or a local service configuration unit associated with the local service. Preferably, the access to configuration data for a local service is made available by the global configuration and activation service in the event of failure of the service configuration unit associated with the local service. This allows firstly rapid and efficient distribution of configuration data to destination control units via said associated service configuration units and secondly increased failsafety through recourse to the global configuration and activation service.

Services of the automation system are preferably provided within a service-oriented architecture by the control units. Service-oriented architectures (SOA) are aimed at structuring services in complex organizational units and making them available to a large number of users. In this case, by way of example, existing components of a data processing system, such as programs, databases, servers or websites, are coordinated such that benefits provided by the components are combined to form services and are made available to authorized users. Service-oriented architectures allow application integration by concealing complexity of individual subcomponents of a data processing system behind standardized interfaces. This results in particularly safe and flexible provision of control information for a computer-based object in an automation system.

The automation system according to the invention comprises a plurality of control units connected to one another via a communication network for providing functions of the automation system as services. The services are configurable by means of configuration data and activatable. Here, components of a service can be combined by a local service configuration unit using a standard configuration interface to form a service. In addition, a control and monitoring unit is provided for providing configuration data which comprise information relating to the attribution of services to control units and to dependencies between services. Furthermore, the automation system in accordance with the invention includes a computer unit for providing a system configuration service for accepting the configuration data from the control and monitoring unit and also for checking and forwarding the configuration data to the destination control units.

Furthermore, at least one local service configuration unit associated with a destination control unit is provided. The local service configuration unit is used to check transmitted configuration data for changes in comparison with previously used configuration data and to ascertain lists of operations for performing configuration changes using detected changes in the configuration data. Here, the lists of operations are optimized to minimize service downtimes. Furthermore, the local service configuration unit is used to perform and/or prompt the ascertained operations for accepting configuration changes for local services.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below using an exemplary embodiment with reference to the drawings, in which.

DETAILED DESCRIPTION OF THE PRESENTLY PREFERRED EMBODIMENTS

Figure 1:
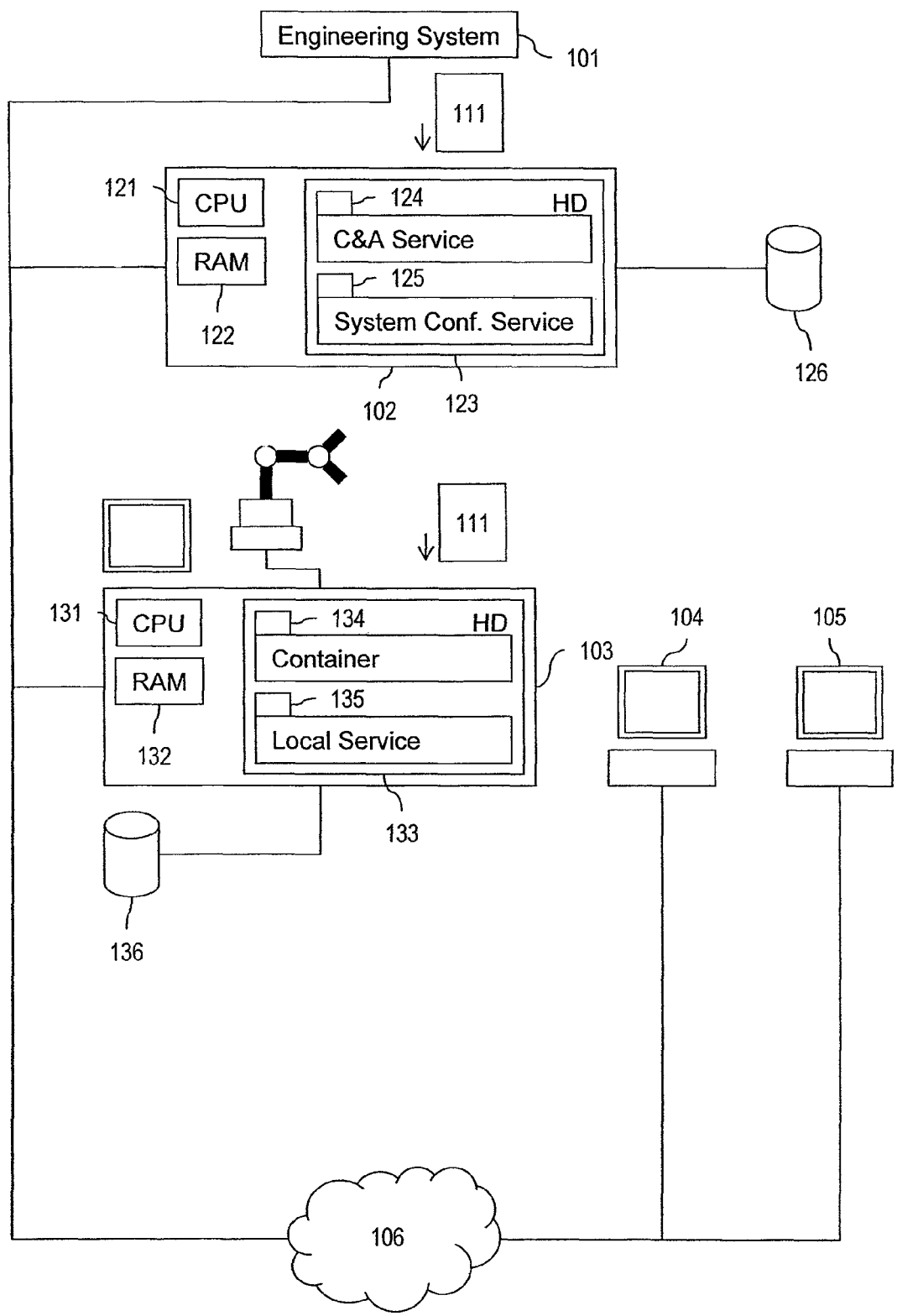
FIG. 1 shows a schematic illustration of an automation system having a plurality of control units connected to one another over a communication network in accordance with an embodiment of the invention.

The automation system shown in the FIG. 1 comprises an engineering system 101, a computer unit 102 and a plurality of programmable control units 103-105 which are connected to one another as network nodes by a communication network 106. The control units 103-105 provide functions of the automation system as local services which are configured by configuration data and activated.

The engineering system 101 is used for configuring, maintaining, starting up and documenting the automation system and provides configuration data 111. The configuration data 111 comprise information relating to the attribution of services provided to control units 103-105 and information relating to dependencies between services. The configuration data 111 are transmitted to the computer unit 102 and checked by a global configuration and activation service, provided by the computer unit 102, or by a system configuration service and forwarded to a respective one of the control units 103-105.

The system configuration data 111 are checked by local service configuration units associated with the control units 103-105 for changes in comparison with previously used configuration data. Furthermore, the local service configuration units are used for combining components of a service to form the service using a standard configuration interface. Detected changes in the configuration data are used by the local service configuration units to ascertain lists of operations for performing configuration changes. Here, the lists of operations are optimized to minimize service downtimes. Finally, the local service configuration units perform the ascertained operations for accepting configuration changes for local services or for prompting the operations to be performed. In particular, the performance of the ascertained operations provides resources which are required for activating local services. Furthermore, the local service configuration units provide requisite configuration data for the local services at runtime.

The computer unit 102 and the control units 103-105 comprise at least a respective processor 121, 131, main memory 122, 132 and hard disk 123, 133 for the nonvolatile storage of program code, application data and user data. The hard disk 123 of the computer unit 102 stores program code 124 for providing the global configuration and activation service and program code 125 for providing the system configuration service. Furthermore, the hard disk 133 of a control unit 103 stores program code 134 for implementing a local service configuration unit and program code 135 for providing a local service. In the present exemplary embodiment, the local service is used for actuating metrological or actuator-based peripherals, such as sensors or robots. The program code 124, 125, 134, 135 stored on the hard disks 123, 133 can be loaded into the main memory 122, 132 of the computer unit 102 and the control unit 103 and can be executed by the respective processor 121, 131 to provide the above services.

The configuration data 111 for all local services provided by the control units 103-105 are stored in a global database 126 of the computer unit 102. In addition, configuration data are stored for redundancy and performance reasons for a selected local service in a local database 136 of a control unit 103 which is associated with the selected local service. Access to configuration data for a local service can be made available either by the global configuration and activation service or by a local service configuration unit. Preferably, the access to configuration data for a local service is made available by the global configuration and activation service in the event of failure of the respective local service configuration unit.

Figure 2:
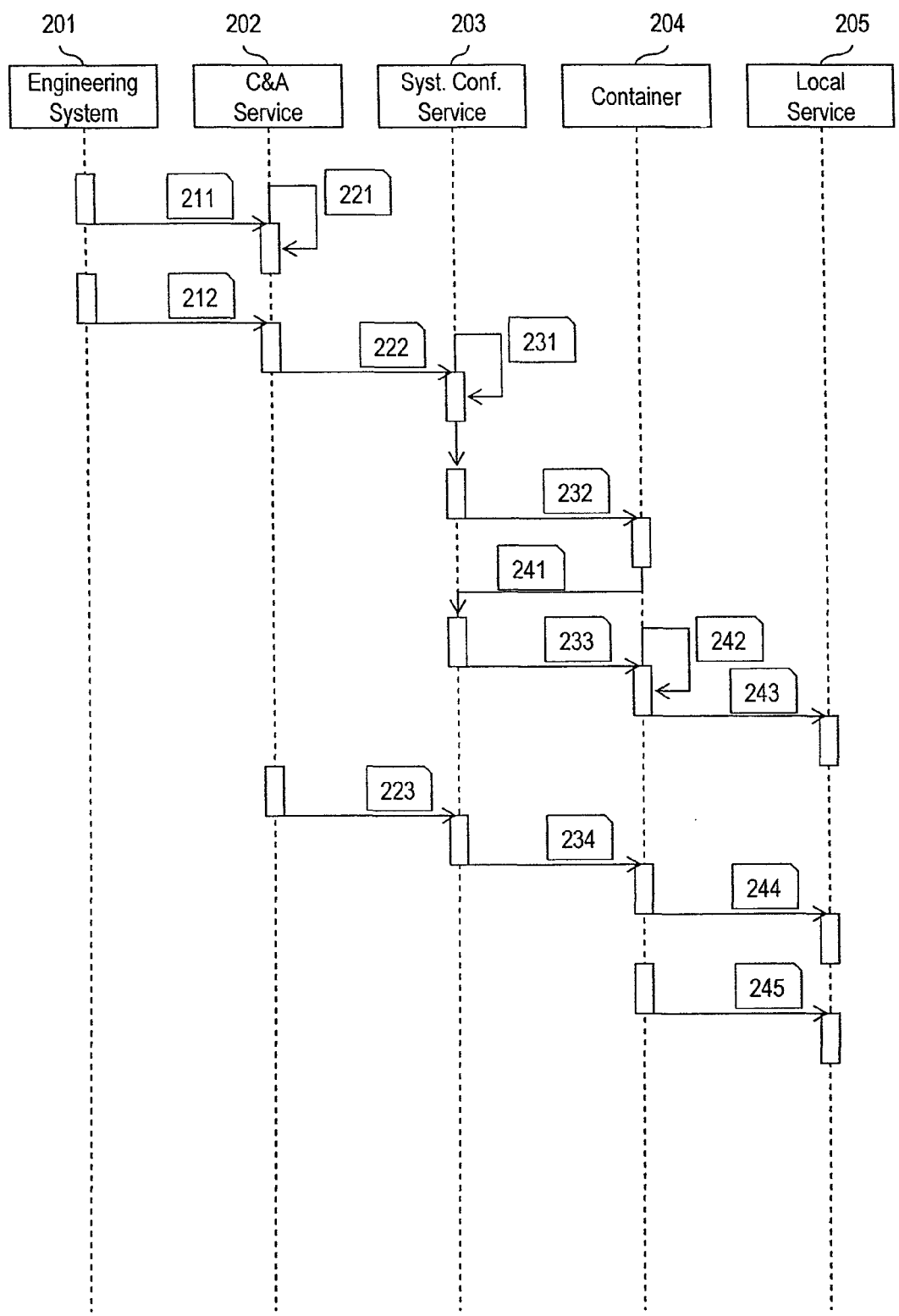
FIG. 2 shows a chart relating to interchange of messages for providing configuration data to destination computer units and activating local services using the provided configuration data in accordance with an embodiment of the invention.

As shown in FIG. 2, the provision of the configuration data initially involves a message 211, with the configuration data that are to be provided being transmitted from the engineering system 201 to the global configuration and activation service 202. Next, the global configuration and activation service 202 performs a consistency check on the transmitted configuration data. If the consistency check is successful, a message 221 is used to prompt storage of the configuration data by the global configuration and activation service 202. The messages shown in FIG. 2 also comprise internal messages interchanged between computer-based objects in a runtime system for the purpose of initiating function calls.

If the storage of the configuration data by the global configuration and activation service 202 is successful, the engineering system 201 transmits a message 212 for activating a changed configuration to the global configuration and activation service 202. The global configuration and activation service 202 then transmits a message 222 to the system configuration service 203 to initiate a preparation phase for accepting changed configuration data. A message 231 is then used to prompt reading of the changed configuration data by the system configuration service 203.

If the reading of the changed configuration data by the system configuration service 203 is successful, a message 232 for initiating a preparation phase for changed configuration data is transmitted from the system configuration service 203 to the service configuration unit 204 associated with a local service 205 which is to be reconfigured. The service configuration unit 204 then uses a message 241 to request the changed configuration data from the system configuration service 203. The system configuration service 203 then transmits a message 233 comprising the changed configuration data to the service configuration unit 204.

Following transmission of the changed configuration data to the service configuration unit 204, a message 242 is used to prompt a check on the changed configuration data by the service configuration unit 204 for changes in comparison with previously used configuration data. Here, the service configuration unit 204 uses detected changes in the configuration data to ascertain lists of operations for performing configuration changes. The service configuration unit 204 then uses a message 243 to the local service 205 which is to be reconfigured to prompt reconfiguration of newly added service components to be started. If the newly added service components are started successfully, the preparation phase is fully completed, and the global configuration and activation service 202 is notified of this. In FIG. 2, the notification is not explicitly shown.

Following successful completion of the preparation phase, the global configuration and activation service 202 transmits a message 223 to the system configuration service 203 to initiate a finishing phase or commit phase. The system configuration service 203 then uses a message 234 to prompt the service configuration unit 204 to provide the local service 205 which is to be reconfigured in a finishing phase using configuration data loaded in the preparation phase and the ascertained operations for performing configuration changes. The service configuration unit 204 then transmits a message 244 to the local service 205 which is to be reconfigured to stop the reconfiguration of service components which are no longer required. Next, a message 245 from the service configuration unit 204 to the local service 205, which is to be reconfigured, is used to prompt loading of the changed configuration data and performance of the operations ascertained in the preparation phase. If the finishing phase has ended successfully, the service configuration unit 204 notifies the global configuration and activation service 202 using a message (not shown) which is forwarded using the system configuration service.

In the event of failure of the preparation or finishing phase, the local service 205 is provided in a reset phase using configuration data associated with a last error-free status. This is performed using version information which is stored for configuration data in version tables. In certain embodiments, the version information is advantageously stored in the global database 126 for the computer unit 102 alignment purposes.

Figure 3:
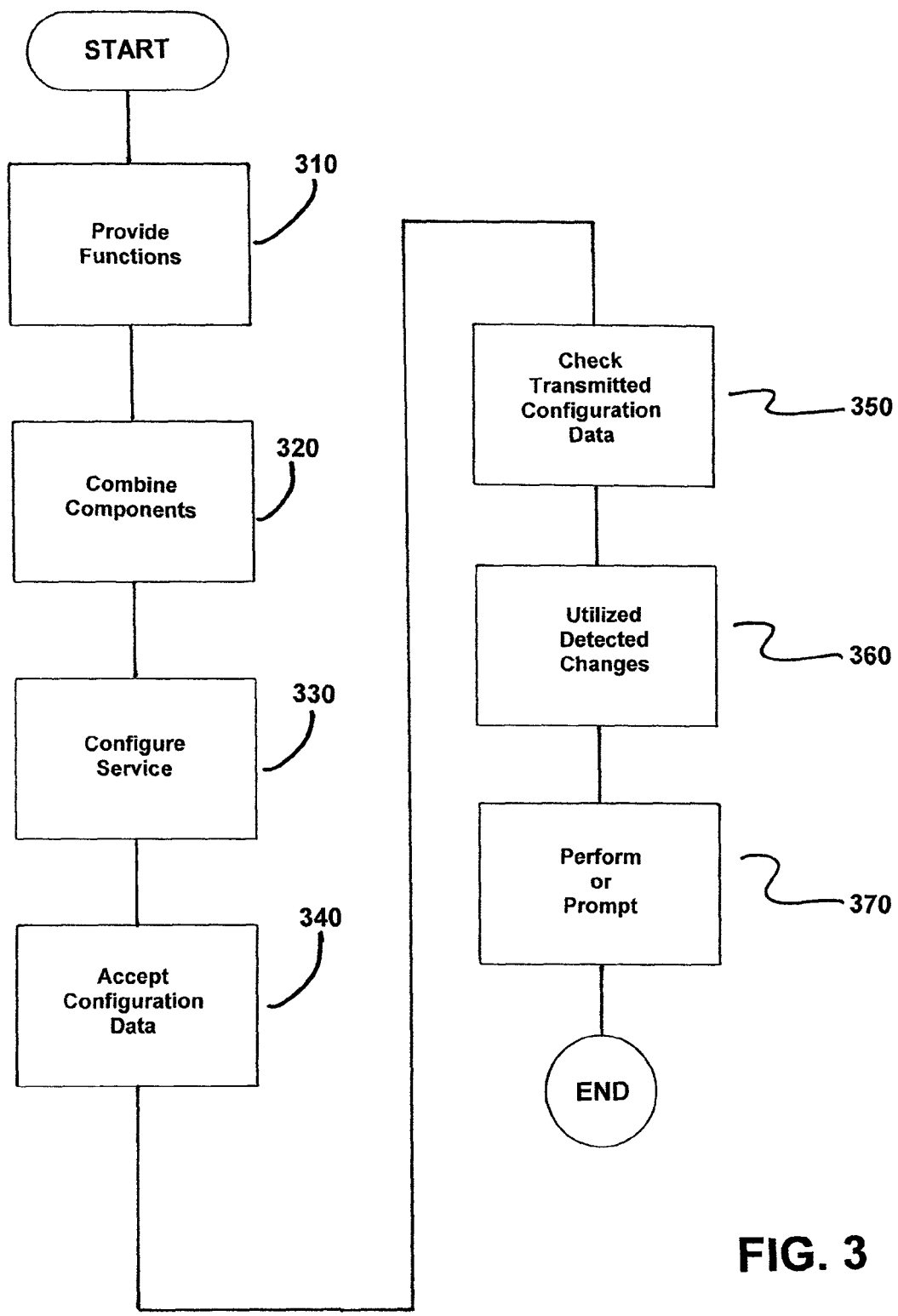
FIG. 3 is a flow chart illustrating a method in accordance with an embodiment of the invention.

FIG. 3 is a flow chart showing a method for the consistent provision of configuration data in an industrial automation system comprising a plurality of networked control units. The method comprises providing functions of the industrial automation by services from the plurality of networked control units, as indicated in step 310.

Components of the services are combined by a local service configuration unit using a standard configuration interface to form a service, as indicated in step 320. The service is then configured by configuration data and activating the service, as indicated in step 330. Here, the configuration data comprises information relating to an attribution of the services to the plurality of networked control units and to dependencies between the services of the plurality of control units.

The configuration data are accepted from a control and monitoring unit in the industrial automation system by a system configuration service, checked and transmitted to destination control units of the plurality of networked control units, as indicated in step 340.

Next, the transmitted configuration data are checked by local service configuration units associated with the destination control units for changes in comparison with previously used configuration data, as indicated in step 350. The detected changes are utilized in the configuration data at the local service configuration units to ascertain lists of operations for performing configuration changes, as indicated in step 360. Here, the lists are optimized to minimize service downtimes. The ascertained lists of operations are then performed and/or are prompted to accept configuration changes for local services, as indicated in step 370.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for consistent provision of configuration data in an industrial automation system comprising a plurality of networked control units, comprising:

providing functions of the industrial automation system by services from each of said plural networked control units;

combining components by a local service configuration unit of said plural control units using a standard configuration interface to form a service;

configuring the service by configuration data and activating the service, the configuration data comprising information relating to an attribution of the services to the plural networked control units and to dependencies between the services of each of said plural control units;

accepting the configuration data from a control and monitoring unit in the industrial automation system by a system configuration service, checking the accepted configuration data and transmitting the checked configuration data to destination control units of said plural networked control units;

checking the transmitted configuration data by local service configuration units associated with the destination control units for changes in comparison with previously used configuration data;

utilizing the detected changes in the configuration data at the local service configuration units to ascertain lists of operations for performing configuration changes, the lists being optimized to minimize service downtimes; and at least one of performing and prompting the ascertained lists of operations to accept configuration changes for local services;

wherein the service comprises a local service and activating the local service comprises:

loading the configuration data in a preparation phase and providing the local service in a finishing phase using the configuration data loaded in the preparation phase; and providing the local service in a reset phase using configuration data associated with a last error-free status upon failure of at least one of the preparation phase and finishing phase.

2. The method as claimed in claim 1, wherein the local service comprises service components distributed over each of said plural networked control units.

3. The method as claimed in claim 1, wherein the configuration data required at runtime are provided by the local service configuration units.

4. The method as claimed in claim 2, wherein the configuration data required at runtime are provided by the local service configuration units.

5. The method as claimed in one of claim 1, further comprising:

storing the configuration data for all control units in the industrial automation system in a central database; and storing the configuration data for a selected control unit of each of said plural control units in a local database associated with the selected control unit.

6. The method as claimed in claim 5, wherein the central database and local databases comprise version tables associated with a respective stored configuration data and aligned with each other.

7. The method as claimed in claim 1, wherein access to configuration data for a local service of the services is made available by one of a global configuration service-and-activation service and the local service configuration unit.

8. The method as claimed in claim 7, wherein the global configuration-and-activation service provides access to the configuration data for the local service in an event of failure of the local service configuration unit associated with the local service.

9. The method as claimed in claim 1, wherein the services in the industrial automation system are provided within a service-oriented architecture by each of said plural networked control units.

10. The method as claimed in claim 1, wherein the control and monitoring unit comprises an engineering system configured to at least one of configure, maintain, start up and document the industrial automation system.

11. The method as claimed in claim 1, wherein the industrial automation system comprises one of a production, process or building industrial automation system.

12. The method as claimed in claim 1, wherein each of said plural networked control units are programmable.

13. An industrial automation system, comprising:

a plurality of control units interconnected by a communication network and configured to provide functions of the industrial automation system as services which are configurable by configuration data and activatable, each of said plural control units comprising a local service configuration unit, components of one of the services being combinable by an associated one of the local service configuration units using a standard configuration interface to form the services;

a control and monitoring unit configured to provide configuration data which comprise information relating to an attribution of the services to each of said plural control units and to dependencies between the services; and a computer unit for providing a system configuration service configured to accept the configuration data from the control and monitoring unit and configured to check and forward the configuration data to destination control units of said plural control units;

wherein at least one of the local service configuration units associated with one of the destination control units is configured to:

check transmitted configuration data for changes in comparison with previously used configuration data;

ascertain lists of operations for performing configuration changes using detected changes in the configuration data; and at least one of perform and prompt the ascertained list of operations for accepting the configuration changes for local services;

wherein the lists of operations are optimized to minimize service downtimes; and wherein the service comprises a local service and activating the local service comprises:

loading the configuration data in a preparation phase and providing the local service in a finishing phase using the configuration data loaded in the preparation phase; and providing the local service in a reset phase using configuration data associated with a last error-free status upon failure of at least one of the preparation phase and finishing phase.

* * * * *